Patented Mar. 14, 1933

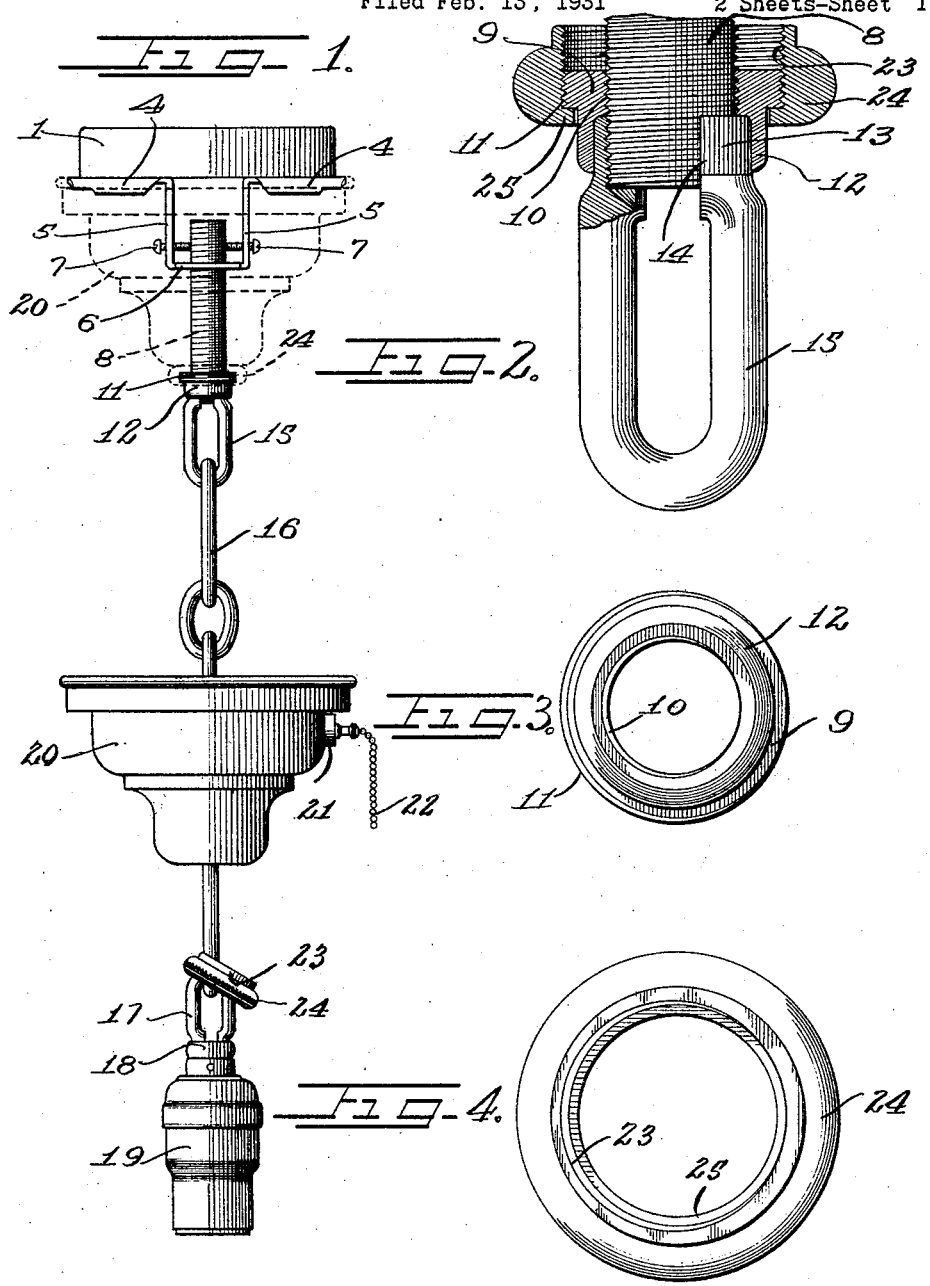

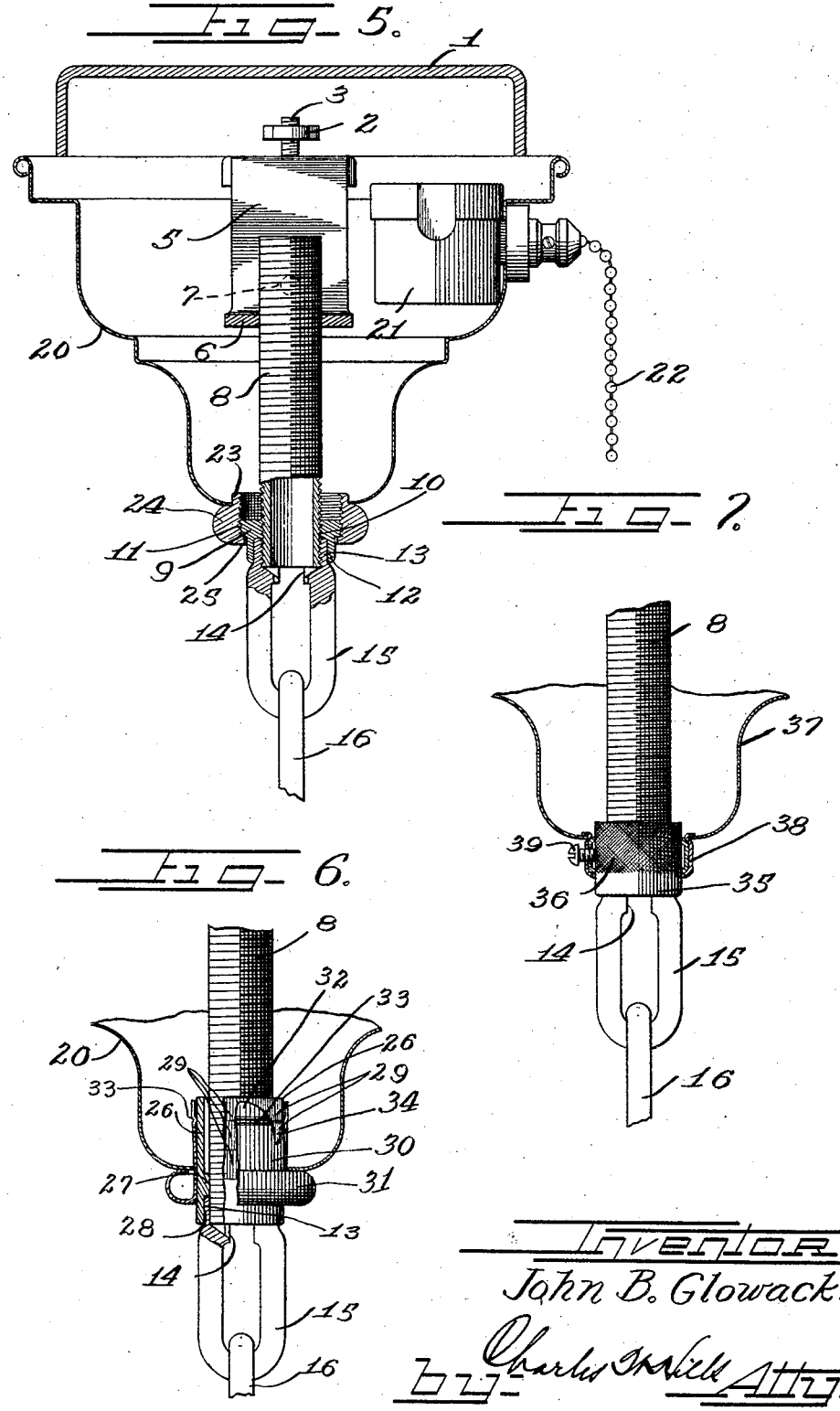

1,901,234

UNITED STATES PATENT OFFICE

JOHN B. GLOWACKI, OF CHICAGO, ILLINOIS

FIXTURE AND CANOPY SUPPORT

Application filed February 13, 1931. Serial No. 515,568.

This invention relates to an improved type of fixture and canopy supporting unit comprising a plurality of members adapted to be readily assembled or dismembered with said unit embracing a fixture supporting member and a canopy supporting member separated by means of an improved coupler adapted to be associated with the lower end of a threaded stem the upper end of which is adjustably engaged in a fixture bridge to which said stem after being adjusted is adapted to be locked by set screws or the like, thereby affording an arrangement whereby a fixture and a canopy together with a supporting bridge and stem may be connected together by the improved coupling unit to produce an assembly of parts and fixtures completely wired and ready for mounting upon an outlet box, after which the bridge and stem may be conveniently enclosed by the canopy which is slidably pushed into position and retained in proper place by the canopy supporting member forming part of the coupling unit of this invention.

It is an object of this invention to provide an improved coupling unit embracing a plurality of removably associated parts for connecting a fixture with fixture supporting members and furthermore serving as a means for removably supporting a canopy in position to enclose the fixture supporting members after the same have been connected to an outlet box or the like.

It is also an object of this invention to provide an improved fixture and canopy support including in combination a bridge and stem adjustably interlocked, with said stem having removably assembled on one end thereof a plurality of interfitting members for supporting a fixture and a canopy in proper associated relation with the canopy enclosing the bridge and stem to produce a finished fixture assemblage.

It is a further object of this invention to provide a fixture and canopy support including in combination a threaded stem having adjustably engaged thereon a coupler which is internally and externally threaded for the purpose of removably receiving a split fixture supporting loop between the stem and coupler and furthermore adapted to have adjustably engaged on the exterior thereof a canopy supporting ring member.

It is furthermore an object of this invention to provide an improved type of fixture and canopy support wherein a stem adjustably connected with a supporting bridge has removably engaged on the lower end thereof a fixture supporting split loop and a coupler which is so constructed that a canopy and a canopy supporting member which normally are slidably carried on the fixture chain may be slidably moved upwardly over the split loop and the coupler permitting the canopy supporting ring to be adjustably engaged on the coupler for retaining the canopy in a proper position of adjustment and enclosing the stem and the supporting bridge to which it is adjustably attached.

It is an important object of this invention to provide an improved type of fixture and canopy support wherein a supporting bridge has locking means engaged thereon for engaging and holding a stem locked in an adjusted position with respect to the bridge to permit a completely wired fixture having a canopy and a canopy supporting member loosely engaged on the fixture supporting chain or stem to be connected to the adjusted stem by means of a split loop and an improved coupler adapted not only to hold the split loop secured to the supporting stem but furthermore permitting the canopy to be moved upwardly on the fixture chain and over the split loop allowing the canopy supporting member to be also slipped over the supporting loop and removably engaged on the improved coupler to support and hold the canopy tightly braced or locked in position against a ceiling to enclose the supporting bridge and the stem connected therewith, said canopy when locked in position by means of the supporting member being prevented from sliding or working downwardly over the stem even when the canopy is equipped with a pull chain switch attachment.

Other and further important objects of this invention will be apparent from the disclosures in the specification and the accompanying drawings.

The invention (in a preferred form) is illustrated in the drawings and hereinafter more fully described.

On the drawings:

Figure 1 illustrates an outlet box having supported thereon a partially assembled fixture and canopy together with the supporting mechanisms therefor which embody the principles of this invention, said figure furthermore illustrating in dotted lines the ultimate position of the canopy with the supporting member therefor engaged with the coupler which also retains the fixture supporting means in position.

Figure 2 is an enlarged fragmentary sectional view of the canopy and fixture supporting unit associated with the lower end of the threaded supporting stem.

Figure 3 is a bottom plan view of the coupler member.

Figure 4 is a top plan view of the canopy supporting ring member.

Figure 5 is a fragmentary sectional view through an outlet box with the canopy and fixture supporting members shown in section and partly broken away and positioned to hold a canopy locked in its ultimate position and equipped with a pull switch device shown in elevation.

Figure 6 is a fragmentary elevational and sectional view of a modified form of fixture and canopy supporting unit engaged on the lower end of a supporting stem.

Figure 7 is a fragmentary sectional view of the lower portion of another type of canopy supported in position on another modified form of fixture and canopy supporting unit shown attached to the lower end of a supporting stem.

As shown on the drawings:

The reference numeral 1 indicates an outlet box which is provided with diametrically opposite lugs 2 having threaded openings therein for the support of retaining or supporting screws 3. The present invention embodies a supporting device for a fixture and a canopy and includes a supporting bridge comprising a pair of apertured end plates or arms 4 which are integrally formed on opposite sides of a middle or intermediate U-shaped section or socket comprising side walls 5 connected at their lower ends by a bottom wall 6. The side walls 5 are provided with threaded apertures for the reception of locking or set screws 7, the inner ends of which are adapted to be adjusted to lockingly contact against the opposite sides of an externally threaded sleeve or stem 8 which is adjustably threaded through a threaded opening provided in the bottom plate 6 of the bridge.

The threaded stem 8 has removably engaged on the lower end thereof an improved fixture and canopy supporting unit, embracing a coupler ring 9 which is provided with an internally threaded section 10 and with an externally threaded section 11. Integrally formed on the lower end of the coupler ring 9 is a socket portion 12, the inner plain wall of which is adapted to be spaced from the exterior threaded surface of the lower portion of the stem 8 when the internally threaded portion 10 of the coupler ring is threaded onto the stem 8 as indicated in Figure 2. The coupler unit is constructed to serve a double purpose, namely that of securing a fixture supporting unit and a canopy supporting unit in position.

The fixture supporting unit comprises a ring or head 13 provided with a diametrical slot 14. Integrally formed on the split head 13 is a fixture supporting loop or link 15 of a diameter or width less than the diameter of the exterior of the coupler ring 9. The split head 13 and the integral loop 15 forming a part thereof provide a split supporting unit adapted to permit a closed link of a fixture supporting chain 16 to be passed downwardly through the slot 14 to permit the fixture supporting chain to be removably engaged on the split loop.

Supported on the lower link of the fixture supporting chain 16 by means of a split loop 17 and a lock ring 18 is an electric socket 19 or any other desired type of fixture or the like.

Slidably engaged on the fixture chain before the same is connected to the split loop 15 is a fixture canopy 20 having an opening in the lower end thereof of a diameter sufficient to permit the same to slip over the chain 16 and over the split loop 15 and the coupler ring 9. As clearly indicated in Figure 5 the canopy 20 has mounted therein a control switch 21 which is operable by means of a pull chain 22 or the like.

For the purpose of supporting and holding the canopy against a ceiling or wall to enclose the bridge and the supporting stem an improved canopy supporting unit is also slidably engaged on the fixture chain 16 beneath the canopy. The canopy supporting unit comprises an internally threaded ring 23 having formed on the exterior thereof a canopy supporting bead or rim 24 which is peripherally knurled to facilitate operation of the canopy supporting unit. Integrally formed on the lower end of the internally threaded ring or sleeve 23 is a flange 25, which when the canopy supporting unit is raised to slide over the split loop 15 and the socket portion 12 of the coupler ring 9 is adapted to be brought into contact with the shoulder formed at the lower end of the externally threaded portion 11 of the coupler ring 9, as clearly illustrated in Figure 2.

Figure 6 illustrates a modified form of fixture and canopy supporting unit in which the parts which are identical in construction to those illustrated in connection with the preferred form of device covered by Figures 1 to 5 of the drawings will be designated by corresponding reference numerals. Adjustably engaged on the lower end of the stem 8 is a modified form of coupler comprising a long sleeve or collar 26 provided with an internal flange 27 which is threaded for engagement with the threaded stem 8. The threaded flange 27 provided in the coupler sleeve 26 affords a socket 28 in which the split head 13 of the fixture supporting loop 15 is adapted to be seated when the internally threaded split head 13 of the loop is threaded onto the lower end of the stem 8 and into the lower end of the coupler to rigidly hold the coupler and the loop locked on the lower end of the stem.

The exterior of the coupler sleeve 26 at the upper portion thereof is provided with a plurality of adjacently disposed straight knurled surfaces 29. While the lower portion of the exterior surface of the coupler sleeve is left smooth or plain. In the modified form of device shown in Figure 6, the chain 16 has slidably engaged thereon a canopy 20, the opening in the lower end of which is of a sufficient diameter to permit the canopy to be slidably moved over the chain links and over the split loop 15 as well as over the knurled coupler sleeve 26. For the purpose of supporting the canopy 20 in position with the upper end of the canopy seated against a wall or ceiling and enclosing the stem 8 a canopy retaining or supporting member or unit is provided and is slidably engaged on the fixture supporting chain 16 beneath the canopy. The canopy supporting unit is of the friction type and is similar to that disclosed in my copending application for patent entitled "Canopy retaining means", United States Serial No. 410,542, filed November 29, 1929. The canopy supporting unit or means comprises a lower sleeve section 30 having integrally formed on the lower end thereof an upwardly curled bead or ring 31. Integrally formed on the upper end of the lower sleeve section 30 is an upper or reduced sleeve section 32 connected with the lower section by means of a shoulder or inwardly directed bead 33. The two sleeve sections 30 and 32 forming the body of the canopy supporting unit are provided with a plurality of spaced longitudinally positioned tapered notches or slots 34, thereby forming a plurality of spring sections adapted to have frictional resilient clamping engagement with the straight knurled surface sections 29 of the coupler sleeve 26. The inwardly directed bead portions 33 of the canopy support are adapted to be moved into frictional clamping engagement with the coupler to securely support the canopy 20 with the lower end of the canopy seated upon the ring or supporting bead 31 when the canopy support is slidably pushed upwardly over the chain 16 and the split loop 15 and onto the coupler sleeve 26 with the split body portion of the canopy support projecting into the opening provided in the bottom of the canopy 20. The knurled coupler is positioned between the canopy supporting unit and the fixture supporting loop and is of sufficient length to permit the canopy support to be frictionally gripped thereon in different positions so that canopies of different depths may be conveniently mounted in position.

Figure 7 illustrates another modified form of fixture and canopy supporting unit in which parts corresponding with those illustrated and described in connection with Figures 1 to 5 inclusive are designated by corresponding reference numerals. In this form of the device a modified form of coupler is provided embracing a sleeve or collar 35 having the upper portion of the exterior surface thereof formed with a criss-cross knurled surface 36. The interior of the coupler 35 is constructed similar to the interior of the coupler 26 in that it has a threaded flange positioned above a socket or pocket for the reception of the split head of the fixture supporting loop 15. The coupler 35 is threaded onto the lower end of the stem 8 until the lower end of the coupler is substantially level with the lower end of the stem after which the internally threaded split head of the split loop 15 is threaded onto the lower end of the stem and into the pocket provided in the lower end of the coupler 35 to cause the coupler 35 and the fixture supporting split loop 15 to be locked in position with the fixture supported on the stem by means of the split supporting loop. Slidably engaged on the fixture chain 16 is a canopy 37 provided with a bead or collar 38 on the lower end thereof having an inner diameter sufficient to permit the canopy to be pushed upwardly over the links of a chain and over the split supporting loop 15 to be engaged around the knurled surface 36 of the coupler 35. After the canopy has been moved into position with the supporting collar or bead 38 engaged around the knurled surface 36 of the coupler a set screw 39 adjustably threaded through a threaded opening in the collar or bead 38 is tightened to permit the inner end thereof to grip against the knurled surface 36 thereby holding the canopy locked in a set position of adjustment with the upper end of the canopy seated against a wall or ceiling and with said canopy enclosing the supporting stem 8.

The present invention thus provides a fixture and canopy supporting unit comprising a plurality of members adapted to be conveniently assembled on the lower end of a fixture supporting stem. The canopy supporting member is so formed that the same may be slidably engaged on the fixture chain beneath a canopy to permit the stem and the bridge on which it is adjustably supported to be raised in position with the fixture and canopy supported on the lower end of the stem so that an entire fixture installation with the wiring in place may be conveniently raised and connected in position upon an outlet box. After the bridge has been attached to the outlet box in the usual manner, the fixture wires may be connected with the terminal wires in the outlet box after which it is only necessary to slide the canopy supporting unit upwardly over the chain and the split loop thereby raising the canopy from the full line position of Figure 1 into the dotted line position with the upper end of the canopy engaged against the wall or ceiling and with the canopy supporting ring threaded onto the exteriorly threaded portion 11 of the coupler ring 9, thereby holding the canopy locked in a set position of adjustment and enclosing the bridge and the stem. With the improved canopy supporting ring secured on the coupler it will be seen that the pull switch chain 22 of the switch mechanism 21 mounted in the canopy may be operated at will without any danger of the canopy being pulled downwardly from its set position of adjustment.

It will of course be understood that various details of construction may be varied through a wide range without departing from the principles of this invention and it is therefore not the purpose to limit the patent granted hereon otherwise than necessitated by the scope of the appended claims.

I claim as my invention:

1. A fixture and canopy supporting unit comprising a coupler attachable to a fixture supporting stem, a fixture supporting unit having a split head projecting into said coupling and engaged on said stem to hold the coupler locked in position, and a canopy supporting unit adjustably engaged on said coupler for supporting a canopy.

2. A fixture and canopy support comprising in combination with a threaded stem, of an interiorly and exteriorly threaded coupler adjustably engaged on said stem, an internally threaded split fixture supporting loop adjustably threaded on said stem and projecting into said coupler, and an interiorly threaded canopy supporting ring adjustably threaded on said coupling.

3. A fixture and canopy support comprising in combination with a threaded stem, of an interiorly threaded coupler adjustably engaged on said stem, a fixture supporting split loop having the split portion thereof internally threaded for engagement on said stem with the split portion projecting into said coupler, and a canopy supporting means adjustably engaged over said coupler for holding a canopy supported in position with the canopy enclosing the stem.

4. A fixture and canopy support comprising in combination a bridge having a threaded opening therein, a stem adjustably threaded through said opening, an internally threaded coupler adjustably engaged on said stem and having a socket forming a part thereof, an internally threaded split fixture supporting loop adjustably threaded on said stem and projecting into the coupler socket, and a canopy supporting means adjustably engaged on said coupler for supporting a canopy in position to enclose the bridge and said stem.

5. A fixture and canopy support comprising in combination a bridge having a threaded opening therein, a threaded stem adjustably threaded through said opening, means carried by said bridge for engaging said stem to hold the same locked in a set position of adjustment, a threaded coupler adjustably engaged on said stem, a threaded split fixture supporting loop adjustably engaged on said stem and projecting into said coupler, and a canopy supporting means adjustably engaged over said coupler for supporting a canopy in position to enclose said bridge and stem.

6. A fixture and canopy supporting device comprising in combination a supporting bridge, a stem adjustably engaged therewith, means for locking the stem in a set position of adjustment with respect to the bridge, a coupler adjustably engaged on said stem, a split fixture supporting loop adjustably engaged on said stem and projecting into said coupler, and a canopy supporting means adjustably engaged on the exterior of said coupler.

7. A fixture and canopy support comprising in combination a threaded stem, a coupler, a threaded flange integrally formed in said coupler, a split fixture supporting loop engaged on said stem and projecting into said coupler for holding the coupler and said split loop locked on said stem, and a canopy supporting member constructed to permit the same to be slidably engaged over said split fixture supporting loop and be engaged on the exterior of said coupler to hold a canopy supported in place.

8. A fixture and canopy support comprising in combination a threaded stem, an internally and externally threaded coupler adjustably engaged on said stem, an internally threaded split fixture supporting loop threaded onto said stem and projecting into the coupler to hold the coupler and loop locked with respect to the stem, and a flanged internally threaded canopy supporting member adapted to be slidably engaged over said split loop and be adjustably threaded onto said coupler to hold a canopy supported in a set position of adjustment.

In testimony whereof I have hereunto subscribed my name at Chicago, Cook County, Illinois.

JOHN B. GLOWACKI.